United States Patent [19]

Ezaki et al.

[11] 4,244,991

[45] Jan. 13, 1981

[54] METHOD OF APPLYING WATER PAINT

[75] Inventors: Hideo Ezaki, Toyota; Eiichi Imao, Nagoya; Takayuki Masuyama, Toyota; Mamoru Sugiura, Hekinan, all of Japan

[73] Assignee: Toyota Jidosha Kogyo Kabushiki Kaisha, Toyota, Japan

[21] Appl. No.: 910,907

[22] Filed: May 30, 1978

Related U.S. Application Data

[63] Continuation of Ser. No. 749,375, Dec. 10, 1976.

[30] Foreign Application Priority Data

Dec. 15, 1975 [JP] Japan ................... 50-149239

[51] Int. Cl.³ .............................. B05D 3/02
[52] U.S. Cl. ................... 427/226; 427/385.5
[58] Field of Search ............... 427/226, 341, 302, 303, 427/385 R, 340

[56] References Cited

U.S. PATENT DOCUMENTS

| | | | |
|---|---|---|---|
| Re. 28,957 | 9/1976 | Drelich et al. ................... | 427/340 |
| 1,354,123 | 9/1920 | Montz ................................. | 427/341 |
| 2,406,692 | 8/1946 | Jones et al. ..................... | 427/226 |
| 2,973,285 | 2/1961 | Berke et al. ..................... | 427/341 |
| 3,332,794 | 7/1967 | Hart .................................. | 427/341 |
| 3,826,673 | 7/1974 | Batson et al. ................... | 427/340 |
| 3,849,173 | 11/1974 | Drelich et al. ................. | 427/340 |
| 3,965,284 | 6/1976 | Xanthos et al. ................ | 427/340 |
| 4,008,353 | 2/1977 | Gross et al. .................. | 427/385 R |

FOREIGN PATENT DOCUMENTS

| | | | |
|---|---|---|---|
| 6716238 | 4/1968 | Netherlands . | |
| 1029055 | 5/1966 | United Kingdom ............... | 427/341 |
| 342761 | 7/1972 | U.S.S.R. . | |

*Primary Examiner*—Ronald H. Smith
*Assistant Examiner*—Janyce A. Bell
*Attorney, Agent, or Firm*—Brisebois & Kruger

[57] ABSTRACT

Method of applying water paint in which compound capable of increasing, when decomposed, the hydrogen ion and viscosity of the paint used is added to a water-dispersible paint or a blend of a water-dispersible paint and a water-soluble paint, or is added during the coating step or is applied to the wet paint film by simultaneous spraying.

1 Claim, 2 Drawing Figures

F I G. 2
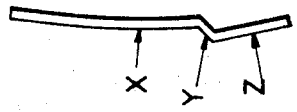
F I G. 1
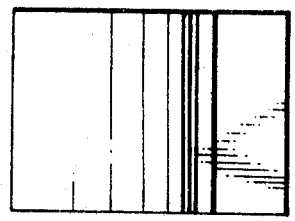

METHOD OF APPLYING WATER PAINT

This is a continuation of application Ser. No. 749,375, filed Dec. 10, 1976.

BACKGROUND OF THE INVENTION

In the conventional practice of applying a film of water paint having a specific thickness, the paint is first sprayed on the object to be painted and then the wet film thus formed is baked or dried.

When the water paint used has a low viscosity on account of low solid content and high solvent content the paint is easily atomized and yields a smooth film, but is likely to sag. Moreover, in time during baking or drying, the viscosity of the paint decreases when heated, which promotes sagging and at the same time increases any popping tendency which is likely to occur where the sagged paint collects.

On the contrary, when the water paint used is a high viscosity paint, on account of a high solid content and low solvent content, the smoothness of the film formed is poor but sagging is not liable to occur. Moreover during baking or drying, the decrease in paint viscosity due to heat is small; the smoothness of the film becomes poor and the sagging is less likely to happen.

Accordingly, a high-viscosity water paint, which gives poor smoothness of film, although it is free from sagging, spoils the appearance which is a commercially important factor of the product and is accordingly unfit for use. It is for this reason that adoption of a low-viscosity water paint is recommended to avoid the sagging defect of paint.

BRIEF SUMMARY OF THE INVENTION

The present invention relates to a method of applying water paint which is aimed at improving water paint and making it free from the sagging defect of water paint having a high water content which is less easy to vaporize than an organic solvent.

BRIEF DESCRIPTION OF THE DRAWINGS

FIG. 1 is a front elevational view of a test plate used to test the embodiments and reference examples of the present invention.

FIG. 2 is a side view of the test plate of FIG. 1.

In the figures, X, Y, Z are the measuring points for film thickness and painted condition on the test plate.

DETAILED DESCRIPTION OF THE INVENTION

The present inventors have developed the invention in order to provide a sag-free method of applying a low-viscosity water paint.

The method of applying water paint according to the present invention is characterized in that a compound capable of increasing, when decomposed, the hydrogen ion concentration of the paint used, is added to a water-dispersible paint or a blend of a water-dispersible paint and a water-soluble paint or is added during the coating step, or is applied to the wet paint film by simultaneous spraying.

The water-dispersible paints mentioned here are the paints whose viscosity can be increased by adding hydrogen ions, such as acrylic paints, polyester melamine paints, and alkyd paints.

The compound, mentioned here, capable of increasing, when decomposed, the hydrogen ion concentration of the paints, is selected from the group consisting of $(NH_4)_2CO_3$ or $NH_2COONH_4$ which decomposes at 30°–100° C.

According to the method of applying water paint according to the invention, a water-dispersible paint or a blend of a water-dispersible paint and a water-soluble paint to which, say, $(NH_4)_2CO_3$ has been added, is applied at a viscosity which assures good atomization. Thus, the wet paint film formed can have its viscosity increased, in the flash-off stage, the setting stage or the drying stage when the paint is liable to sag, when given the necessary temperature and time for decomposition of the $(NH_4)_2CO_3$. Since $(NH_4)_2CO_3$ in the wet film breaks down into $NH_4OH$ and $CO_2$, $CO_2$ with the escaping from the film, the $NH_4OH$ in the film causes PH value of the film to increase, the resin to be dissolved or the carboxyl group in the resin to be neutralized to turn water-soluble, the wet film has its viscosity rapidly increased, thereby preventing the possibility of sagging by the film.

Next the present invention is to be described in terms of specific examples.

EXAMPLE OF EMBODIMENT 1

A test plate as shown in the front elevation view of FIG. 1 and in the sectional view of FIG. 2 measuring 500 mm × 600 mm was first coated with an electrophoretic undercoat and a middle coat of solvent-type aminoalkyd resin paint. Then the surface to be painted was ground. 7 parts by weight of an aqueous solution of $(NH_4)_2CO_3$ (concentration: 0.98 by weight) was added to 100 parts by weight of a water-dispersible paint with physical properties listed in Table 1 (hereafter to be called the paint A), to bring about a viscosity of 260 centipoises. The paint thus prepared was applied as follows under the painting conditions of Table 2.

TABLE 1

| Physical Properties of Paint A | |
|---|---|
| Items | Physical Properties |
| Type of paint resin | Water-dispersible thermosetting acrylmelamine resin paint |
| Paint color | White |
| Paint viscosity | 450 c.p. |
| Paint solids | 50% wt |
| Neutralization of paint resin | 60% |
| pH of paint | 3.2 |
| Volume of water in volatile content | 74 |

Sequence of Painting

First coating→5 minutes left in booth→second coating→forcible heating 2 minutes 50° C.→5 minutes left in booth→third coating→7 minutes left in booth→baking 30 minutes 150° C.

TABLE 2

| Painting Conditions | |
|---|---|
| Spray gun | "Devil biss" JGS-572 (777FF) |
| Paint eject volume (ml/min) | 400–450 |
| Paint pressure (Kg/cm$^2$) | 1.5 |
| Air pressure (Kg/cm$^2$) | 5.0 |
| Pattern width (cm in diameter) | 3.0 |
| Gun travel speed (m/sec) | 1.0 |
| Booth temperature (°C.) | 20 |
| Booth humidity (% RH) | 75–80 |

TABLE 2-continued

| Painting Conditions | |
|---|---|
| Booth draft (m/sec) | 0.4 |

During coating and baking, the test plate was held vertical and applied with paint until the film was $45\pm2\mu$ thick as measured at X and Z in FIG. 2.

The paint viscosity just before the third coating turned out to be 1820 centipoise as measured at a shear speed of 8.5 sec$^{-1}$ using a "Rotovisco" rotating type viscometer.

Then the painted condition of the test plate was measured at X, Y, Z in FIG. 2 and rated (by visual evaluation) according to the following criteria.

Rating criteria—
○ : practically no sagging or popping
Δ: slight sagging or popping
X: prominent sagging or popping
◉ : absolutely no sagging or popping The results of observations are listed in Table 3.

COMPARATIVE EXAMPLE 1

7 parts by weight of distilled water was added to 100 parts by weight of paint A, thus producing a viscosity of 200 centipoises. The paint thus prepared was applied in the same sequence and under the same conditions as in the example of embodiment 1. The viscosity of the wet film just before the third coating was 520 centipoises.

Next the condition of the painted test plate was evaluated according to the rating criteria used in the example 1, the results being summarized in Table 3.

COMPARATIVE EXAMPLE 2

The test plate was painted in the same way as in comparative example 1 except for omission of the forcible heating of 2 min., 50° C. after the second coating. The viscosity of wet film just before the third coating was 400 centipoise.

Next the condition of the painted test plate was evaluated according to the rating criteria as used in the example 1, the results being summarized in Table 3, in which the viscosity of wet film is also given.

TABLE 3

Ratings of condition of painted test plate and viscosity of wet film

| | Method | | | | | |
|---|---|---|---|---|---|---|
| | Example 1 | | Reference 1 | | Reference 2 | |
| Observed | Defect | | | | | |
| point | Sag | Pop | Sag | Pop | Sag | Pop |
| X | ◉ | ○ | ○ | Δ | ○ | X |
| Y | ○ | Δ | Δ | X | X | X |
| Z | ○ | ○ | Δ | X | X | X |
| Viscosity of wet film | 1820 | | 520 | | 400 | |

Note
Pupping is a painting defect which develops as consequence of vaporization of solvent defoaming.

From Table 3 it is clear that in Example 1 as compared with Comparative Examples 1 and 2 of conventional painting, the viscosity (before the third coating) of wet film rapidly increases in response to slight heating, but the viscosity scarcely increases while the paint is being prepared. Consequently, the atomization during paint application is very good, with no sagging, yielding a very smooth coat.

EXAMPLE 2

100 Parts by weight of a water-dispersible paint having the physical properties listed in Table 4 (hereafter called the paint B) was dispersed in 5 parts by weight of distilled water to produce a viscosity of 200 centipoises.

TABLE 4

| Physical Properties of Paint B | |
|---|---|
| Items | Physical Properties |
| Type of paint resin | Water-dispersible thermosetting acrylmelamine resin |
| Paint color | Silver-metallic |
| Paint viscosity | 856 c.p. |
| Paint solids | 31% wt |
| Neutralization of paint resin | 60% |
| pH of paint | 8.0 |
| Volume of water in volatile content | 73% wt |

The paint was applied to a film thickness of $45\pm2\mu$ on the test plate of Example 1 in the following sequence under the painting conditions listed in Table 2. Then just after the second coating and the third coating an aqueous solution of NH$_2$COONH$_4$ (concentration: 0.5 wt %), at the rate of 4 parts by weight to 100 parts by weight of ejected paint was sprayed.

Baking was carried out in the same way as in Example 1.

Sequence of Painting—

First coating→3 minutes left in booth→second coating→forcible heating, 3 minutes, 50° C.→third coating→7 minutes left in booth→baking, 30 minutes, 150° C.

Next, the condition of the painted test plate was evaluated at X, Y, Z of FIG. 2 in accordance with the rating criteria of Example 1, the results being summarized in Table 5.

COMPARATIVE EXAMPLE 3

The test plate was painted in the same way as in Example 2, except for the omission of the application of an aqueous NH$_2$COONH$_4$ solution just after the second and third coatings in Example 2.

The condition of the painted test plate was evaluated at X, Y, Z of FIG. 2 in accordance with the rating criterion in Example 1, the results being summarized in Table 5.

TABLE 5

Ratings of condition of painted test plate

| | Method | | | |
|---|---|---|---|---|
| | Example 2 | | Reference 3 | |
| Observed | Defect | | | |
| point | Sag | Pop | Sag | Pop |
| X | ○ | ○ | Δ Metal flow | Δ |
| Y | ○ | ○ | X | X |
| Z | ○ | ○ | X | X |

From Table 5 it is clear that no sagging and no topping developed in Example 2; and because the viscosity increase in the wet film in the period between application of the amine compound and heating was slight, a very smooth film can be obtained.

EXAMPLE 3

Using a paint prepared by adding 5 parts by weight of distilled water to 100 parts by weight of the Paint B of Example 2 to produce a viscosity of 200 centipoise, the test plate of Example 1 was coated in the following sequence under the painting conditions of Table 2. During the first coating, 4 parts by weight of an aqueous solution of $NH_2COONH_4$ (concentration: 0.5 wt %) per 100 parts by weight of the paint was sprayed.

Baking was done in the same way as in Example 1.

Sequence of Painting—

First coating→forcible heating, 3 minutes, 50° C.→second coating→3 minutes left in booth→third coating→7 minutes left in booth→baking, 30 minutes, 150° C.

Next the condition of the painted test plate was evaluated at X, Y, Z of FIG. 2 in accordance with the rating criteria of Example 1, the results being summarized in Table 6.

COMPARATIVE EXAMPLE 4

The test plate was painted in the same way as in Example 3 except for the omission of the simultaneous spraying of an aqueous solution of $NH_2COONH_4$ during the first coating step in Example 3.

The condition of the painted test plate was evaluated at X, Y, Z of FIG. 2 in accordance with the rating criteria of Example 1, the results being summarized in Table 6.

TABLE 6

Ratings of the Condition of Painted Test Plate

| Observed point | Method | | | |
|---|---|---|---|---|
| | Example 3 | | Reference 4 | |
| | Defect | | | |
| | Sag | Pop | Sag | Pop |
| X | ● | ○ | △ | △ |
| | | | Metal flow | |
| Y | ○ | ○ | X | X |
| Z | ○ | ○ | X | X |

From Table 6 it is clear that in Example 3, no popping and no sagging occurs. The atomized blending of amine compound by simultaneous spraying is particularly effective in preventing the flow.

The present invention has great practical significance, because, as described above, according to the invented method of applying a water paint, a compound capable of increasing, when decomposed, the hydrogen ion concentration of the paint is added to the water paint or applied to the wet film by simultaneous spraying, thereby increasing the paint viscosity during decomposition of said compound and in consequence preventing painting defects such as sagging or popping.

What is claimed is:

1. The method of improving the sagging and/or popping characteristics of a paint composition after it has been applied to a surface, which method comprises
    (a) utilizing as the applied paint composition a water-dispersible paint or a blend of a water-dispersible paint and a water-soluble paint, which paint composition contains a polymer which increases its viscosity due to the addition of hydrogen ions,
    (b) incorporating into said paint composition, before the paint composition is applied to a surface, a compound that will not increase the hydrogen ion composition of said paint composition unless said compound is heated, said compound being $(NH_4)_2CO_3$ or $NH_2COONH_4$,
    (c) heating said paint composition and said compound after they have been applied to a surface so as to thereby cause said compound to increase the hydrogen ion concentration of said paint composition, whereby the sagging and/or popping characteristics of said applied paint composition are improved.

* * * * *